US011425560B2

(12) United States Patent
Kinugawa et al.

(10) Patent No.: US 11,425,560 B2
(45) Date of Patent: Aug. 23, 2022

(54) COMMUNICATION SYSTEM FOR WORKING MACHINE AND COMMUNICATION PROCESSING METHOD FOR WORKING MACHINE

(71) Applicant: KUBOTA CORPORATION, Osaka (JP)

(72) Inventors: Ryosuke Kinugawa, Osaka (JP); Keisuke Egashira, Osaka (JP); Keisuke Miura, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 422 days.

(21) Appl. No.: 16/225,641

(22) Filed: Dec. 19, 2018

(65) Prior Publication Data

US 2019/0200224 A1    Jun. 27, 2019

(30) Foreign Application Priority Data

Dec. 21, 2017 (JP) .............................. JP2017-245209

(51) Int. Cl.
*H04W 12/06* (2021.01)
*H04W 8/18* (2009.01)
*H04W 76/10* (2018.01)
*H04W 12/48* (2021.01)

(52) U.S. Cl.
CPC ........... *H04W 12/06* (2013.01); *H04W 8/183* (2013.01); *H04W 12/48* (2021.01); *H04W 76/10* (2018.02)

(58) Field of Classification Search
CPC ..... H04W 12/06; H04W 12/48; H04W 76/10; H04W 8/183

USPC ............................................................ 726/6
See application file for complete search history.

(56) References Cited

U.S. PATENT DOCUMENTS

| 9,363,318 | B2 | 6/2016 | Nelson et al. | |
| 9,537,354 | B2 * | 1/2017 | Bell ...................... | H04W 12/08 |
| 10,769,264 | B2 * | 9/2020 | Gnanasekaran ...... | H04W 12/50 |
| 10,855,664 | B1 * | 12/2020 | Ziraknejad ............ | H04W 76/10 |

(Continued)

OTHER PUBLICATIONS

NPL Search Terms (Year: 2021).*

(Continued)

*Primary Examiner* — Syed A Zaidi
(74) *Attorney, Agent, or Firm* — Greenblum & Bernstein, P.L.C.

(57) ABSTRACT

A communication system for a working machine includes a communication device disposed on the working machine, and a mobile terminal to be connected to the communication device. The communication device transmits a service universal unique identifier (UUID) to the mobile terminal. The mobile terminal transmits unique information to the communication device. The communication device issues connection request to the mobile terminal after receiving the unique information. The mobile terminal requests transmission of authentication information after issuing the connection request, the authentication information being used for paring. The communication device transmits the authentication information to the mobile terminal in response to the request. And, the mobile terminal judges whether the paring is established based on the authentication information, and executes a program based on the service universal unique identifier (UUID) when the paring is established.

19 Claims, 7 Drawing Sheets

(56) References Cited

U.S. PATENT DOCUMENTS

| | | | | |
|---|---|---|---|---|
| 2008/0120698 | A1* | 5/2008 | Ramia | H04L 63/08 726/4 |
| 2009/0264070 | A1* | 10/2009 | Lim | H04W 12/068 455/41.2 |
| 2011/0215921 | A1* | 9/2011 | Ben Ayed | H04B 7/00 340/539.11 |
| 2014/0187219 | A1* | 7/2014 | Yang | H04W 4/023 455/418 |
| 2015/0244878 | A1* | 8/2015 | Macauley | G06F 3/1204 358/1.15 |
| 2015/0341440 | A1* | 11/2015 | Nelson | H04L 67/26 455/41.2 |
| 2016/0254859 | A1* | 9/2016 | Lee | H04W 4/80 455/41.2 |
| 2016/0338117 | A1* | 11/2016 | Pandit | H04L 67/1095 |
| 2018/0020492 | A1* | 1/2018 | Dao | H04L 67/104 |

OTHER PUBLICATIONS

Shahriyar, Rifat, et al. "Controlling remote system using mobile telephony." Proceedings of the 1st international conference on MOBILe Wireless MiddleWARE, Operating Systems, and Applications. 2008. (Year: 2008).*

NPL Search Terms (Year: 2022).*

* cited by examiner

| ServiceUUID (Application identifier) | Application software |
|---|---|
| 5A3A | Setting application |
| 5A3E | Starting application |
| ⋮ | ⋮ |

COMMUNICATION SYSTEM FOR WORKING MACHINE AND COMMUNICATION PROCESSING METHOD FOR WORKING MACHINE

CROSS-REFERENCE TO RELATED APPLICATIONS

The present application claims priority under 35 U.S.C. § 119 to Japanese Patent Application No. 2017-245209, filed Dec. 21, 2017. The content of this application is incorporated herein by reference in their entirety.

BACKGROUND OF THE INVENTION

Field of the Invention

The present invention relates to a communication system for a working machine and to a communication processing method for the working machine.

Description of Related Art

U.S. Pat. No. 9,363,318 is previously known as a technique for performing communication between a vehicle and a mobile terminal. In U.S. Pat. No. 9,363,318, an application identifier used for identifying an application is transmitted from the vehicle computer side to the mobile terminal, and the mobile terminal that has received the application identifier determines an application corresponding to the application identifier, then after activating the application, the mobile terminal side transmits data relating to the application to the vehicle computer.

SUMMARY OF THE INVENTION

A communication system for a working machine includes a communication device disposed on the working machine, and a mobile terminal to be connected to the communication device. The communication device transmits a service universal unique identifier (UUID) to the mobile terminal. The mobile terminal transmits unique information to the communication device. The communication device issues connection request to the mobile terminal after receiving the unique information. The mobile terminal requests transmission of authentication information after issuing the connection request, the authentication information being used for paring. The communication device transmits the authentication information to the mobile terminal in response to the request. And, the mobile terminal judges whether the paring is established based on the authentication information, and executes a program based on the service universal unique identifier (UUID) when the paring is established.

A communication system for a working machine includes a communication device disposed on the working machine, and a mobile terminal to be connected to the communication device. The mobile terminal transmits an advertised packet to the communication device. The communication device transmits a service universal unique identifier (UUID) to the mobile terminal in response to the advertised packet. The mobile terminal transmits unique information to the communication device. The communication device issues connection request to the mobile terminal after receiving the unique information. The mobile terminal requests transmission of authentication information after issuing the connection request, the authentication information being used for paring. The communication device transmits the authentication information to the mobile terminal in response to the request. And, the mobile terminal judges whether the paring is established based on the authentication information, and executes a program based on the service universal unique identifier (UUID) when the paring is established.

A communication processing method for a working machine which connects a communication device disposed on the working machine to a mobile terminal to be connected to the communication device, includes transmitting, by the communication device, a service universal unique identifier (UUID) to the mobile terminal, transmitting, by the mobile terminal, unique information to the communication device, issuing connection request, by the communication device, to the mobile terminal after receiving the unique information, requesting, by the mobile terminal, transmission of authentication information after issuing the connection request, the authentication information being used for paring, transmitting, by the communication device, the authentication information to the mobile terminal in response to the request, and judging, by the mobile terminal, whether the paring is established based on the authentication information and then executing a program based on the service universal unique identifier (UUID) when the paring is established.

A communication processing method for a working machine which connects a communication device disposed on the working machine to a mobile terminal to be connected to the communication device, includes transmitting, by the mobile terminal, an advertised packet to the communication device, transmitting, by the communication device, a service universal unique identifier (UUID) to the mobile terminal in response to the advertised packet, transmitting, by the mobile terminal, unique information to the communication device, issuing, by the communication device, connection request to the mobile terminal after receiving the unique information, requesting, by the mobile terminal, transmission of authentication information after issuing the connection request, the authentication information being used for paring, transmitting, by the communication device, the authentication information to the mobile terminal in response to the request, and judging, by the mobile terminal, whether the paring is established based on the authentication information and then executing a program based on the service universal unique identifier (UUID) when the paring is established.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings as appropriate.

Figure 7:
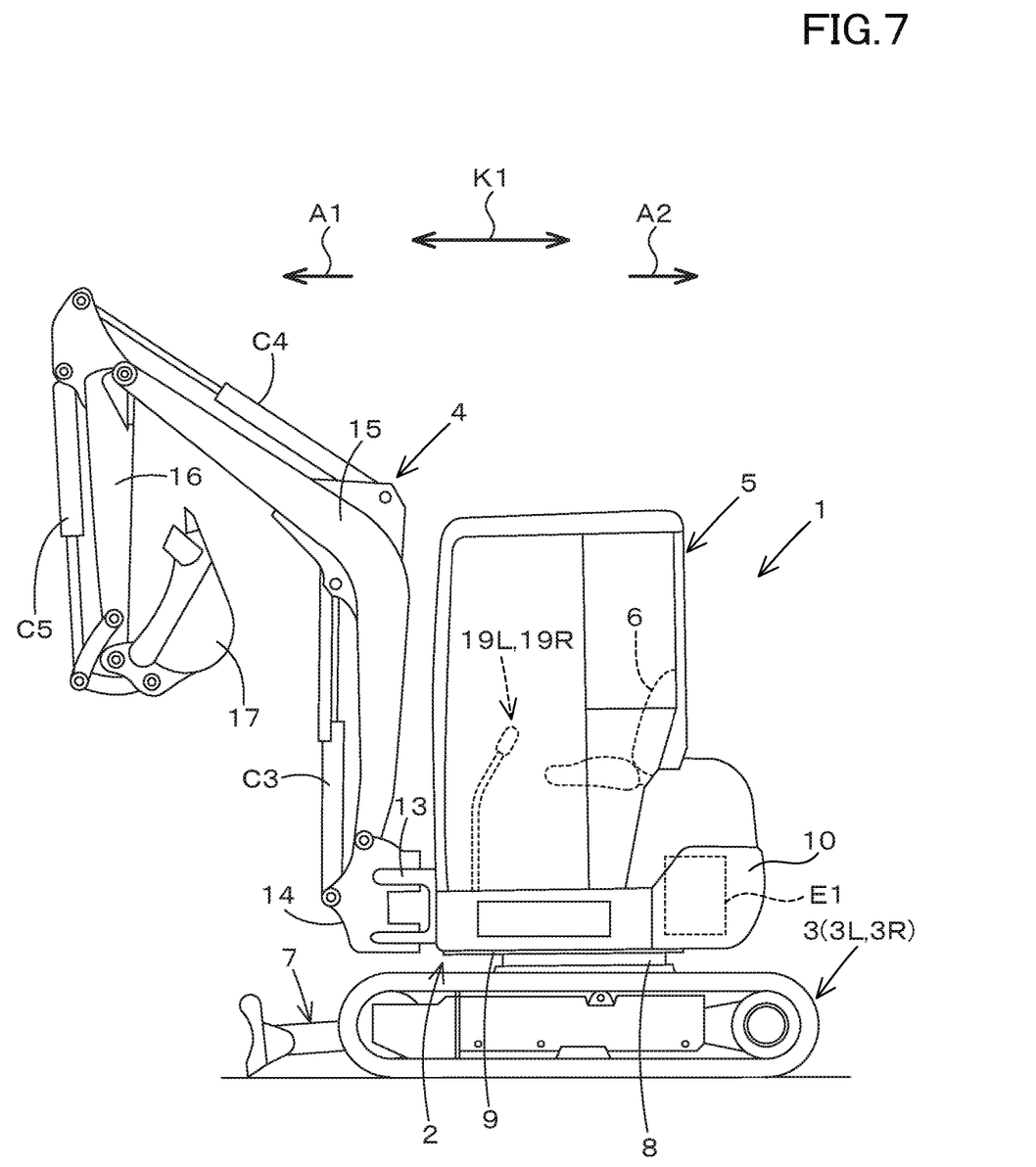
FIG. 7 is a schematic view showing a side surface of a working machine according to the embodiment.

FIG. 7 is a schematic view showing a side surface of the overall configuration of the working machine 1 according to the present embodiment. In the present embodiment, a backhoe which is a swiveling working machine is exemplified as the working machine 1. In this embodiment, although a backhoe is exemplified as the working machine 1, the working machine may be an agricultural machine such as a tractor, a combine, and a rice transplanter, a compact track loader, a skid steer loader, or the like.

The overall configuration of the working machine 1 will be described at first.

As shown in FIG. 7, the working machine 1 includes a machine body 2, a traveling device 3, and a work device 4. A cabin 5 is mounted on the machine body 2. An operator seat 6 is provided in the interior of the cabin 5.

In this embodiment, the front side of a driver (the operator) seated on the operator seat of the working machine 1 (the direction indicated by an arrowed line A1 in FIG. 7) is defined as the front, the rear side of the operator (the direction indicated by an arrowed line A2 in FIG. 7) is defined as the rear, the left side of the operator (on the front surface side of FIG. 7) is defined as the left, and the right side of the operator (on the back surface side of FIG. 7) is defined as the right.

In addition, the horizontal direction which is a direction orthogonal to the front-back direction K1 is referred to as the machine width direction in the explanation. The direction from the center portion of the machine body 2 toward the right portion in the width direction of the machine body 2 will be referred to as a machine outward direction, and the direction from the center portion of the machine body 2 toward the left portion in the width direction of the machine body 2 also will be referred to as the machine outward direction. In other words, the machine outward direction is equivalent to the machine width direction, and means a direction separating away from the center of the machine body 2 in the machine width direction.

The following explanation will be made defining a direction opposite to the machine outward direction as the machine inward direction. In other words, the machine inward direction is equivalent to the machine width direction, and means a direction approaching the center of the machine body 2 in the machine width direction.

As shown in FIG. 7, the traveling device 3 includes a traveling body 3L and a traveling body 3R, the traveling body 3L is provided on the left side, and the traveling body 3R is provided on the right side. The traveling body 3L and the traveling body 3R are each constituted of crawler type traveling devices. A dozer device 7 is attached to the front portion of the traveling device 3. The dozer device 7 is configured to be vertically move (raise and lower the blade) by the stretching and shortening of the dozer cylinder.

The machine body 2 is a turn base (a swiveling base), and is supported on the traveling device 3 so as to be freely turned about a longitudinal axis (an axis extending in the vertical direction) via a turn bearing 8. The machine body 2 is configured to be pivotally driven by a turn motor consisting of a hydraulic motor (a hydraulic actuator). The machine body 2 has a weight 10 and a turn base plate 9 configured to turn about the vertical axis.

The turn base plate 9 is formed of a steel plate or the like, and is connected to the turn bearing 8. The weight 10 is provided at the rear portion of the machine body 2. A prime mover E1 is mounted on the rear portion of the machine body 2. The prime mover E1 is a diesel engine.

Meanwhile, the prime mover E1 may be an electric motor or may be a hybrid type having the diesel engine and the electric motor.

The machine body 2 has a support bracket 13 at the center of the front portion of the machine body 2 in the machine width direction, being arranged slightly rightward. A swing bracket 14 is attached to the support bracket 13 so as to be swingable about the longitudinal axis. A working device 4 is attached to the swing bracket 14.

As shown in FIG. 7, the working device 4 has a boom 15, an arm 16, and a bucket (a working tool) 17. The base portion of the boom 15 is pivotally attached to the swing bracket 14 so as to be rotatable about a horizontal axis (an axis extending in the machine width direction). In this manner, the boom 15 is configured to be freely swung upward and downward.

The arm 16 is pivotally attached to the tip end side of the boom 15 so as to be rotatable about the horizontal axis. In this manner, the arm 16 is configured to be freely swung forward and backward or upward and downward. The bucket 17 is provided on the tip end side of the arm 16 so as to perform the shoveling operation and the dumping operation.

Instead of or in addition to the bucket 17, it is possible for the working tool 1 to mount another working tool (an auxiliary attachment) that is configured to be driven by a hydraulic actuator. Examples of other working tools (the auxiliary attachments) include a hydraulic breaker, a hydraulic crusher, an angle bloom, a ground auger, a pallet fork, a sweeper, a mower, a snow blower, and the like.

The swing bracket 14 is configured to be swung by the stretching and shortening of a swing cylinder that is provided in the machine body 2. The boom 15 is configured to be swung by the stretching and shortening of the boom cylinder C3. The arm 16 is configured to be swung by the stretching and shortening of the arm cylinder C4. The bucket 17 is configured to freely perform the shoveling performance and the dumping operation due to the stretching and shortening of the bucket cylinder (the working tool cylinder) C5.

Each of the dozer cylinder, the swing cylinder, the boom cylinder C3, the arm cylinder C4, and the bucket cylinder C5 is constituted of a hydraulic cylinder (a hydraulic actuator). As shown in the drawings, an operation device 19L is provided on the left side of the operator seat 6 in the cabin 5, and an operation device 19R is provided on the right side of the operator seat 6.

Figure 1:
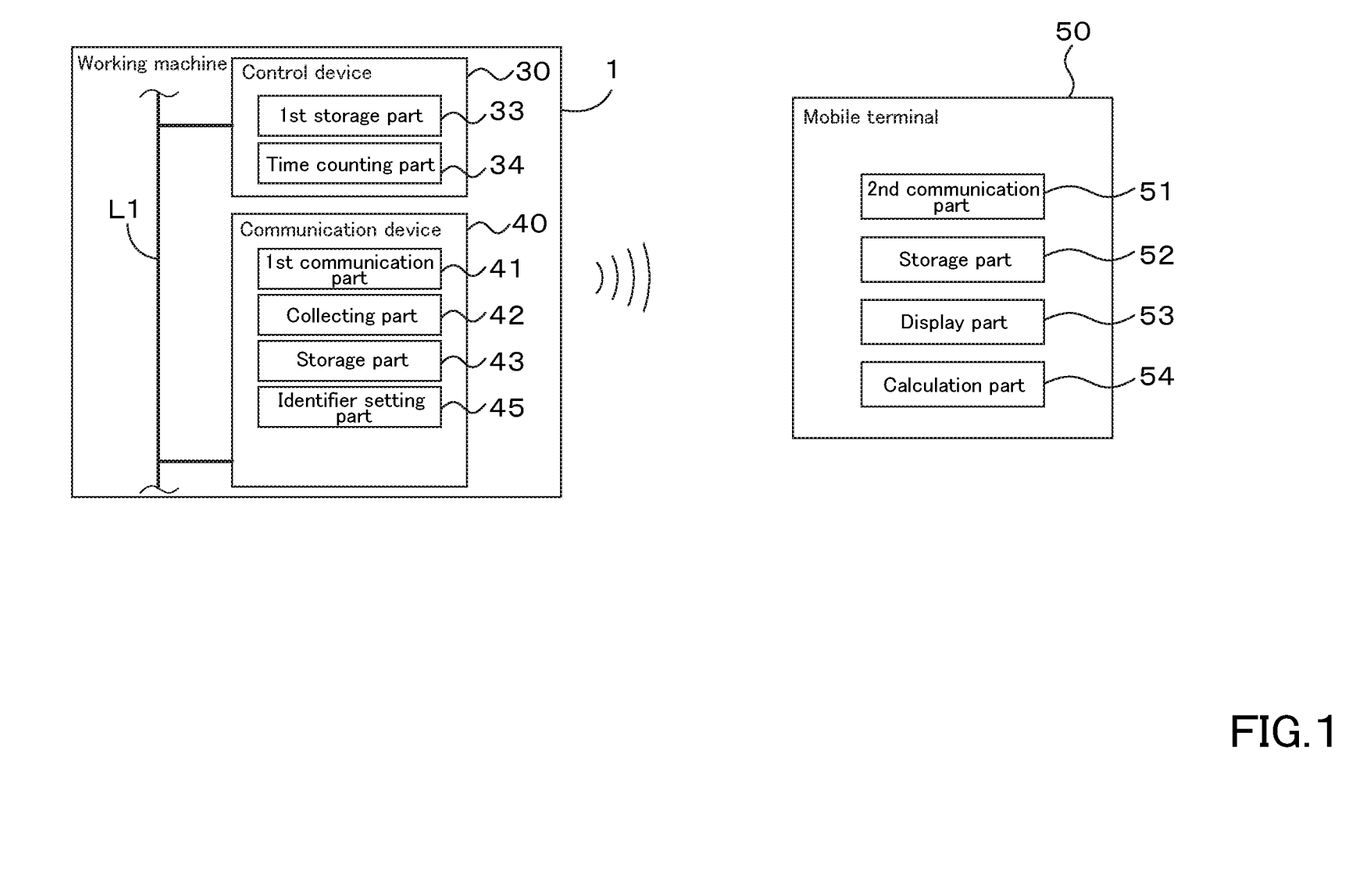
FIG. 1 is a schematic view illustrating a data communication system for a working machine according to an embodiment of the present invention.

As shown in FIG. 1, the working machine 1 has a control device 30. The control device 30 is a device configured to perform the control relating to the working machine 1, and performs various controls such as, for example, the hydraulic control, the automatic idle control (the AI control), the boom height control, the arm height control, and the anti-theft control.

Various sensors are connected to the control device 30, and the values (the signals) detected by the sensors are inputted to the control device 30. For example, an operation amount of the operation device (the operation device 19L, the operation device 19R) detected by a position sensor or the like, a governor angle (a governor position) detected by a governor sensor, an operation amount of the accelerator detected by a position sensor or the like, an engine revolution speed detected by the revolution sensor or the like, and an angle of the arm and an angle of the boom detected by the angle sensor or the like are inputted to the control device 30.

In the hydraulic control, the control device 30 outputs a control signal to the proportional solenoid valve or the like in accordance with the operation amounts of the operation devices 19L and 19R, and sets the opening degree of the proportional solenoid valve and thereby controls a flow rate control valve connected to the proportional solenoid valve.

That is, in the hydraulic control, the flow rate control valve configured to control the hydraulic actuators (the swing cylinder, the boom cylinder C3, the arm cylinder C4, and the bucket cylinder) are controlled.

In the automatic idle control, when the control devices 19L and 19R are operated, the control device 30 outputs, to the engine, the control signal corresponding to the operation amount of the accelerator, and thereby increases and decreases the engine revolution speed. When the operation controllers 19L and 19R are not operated, the control device 30 outputs, to the engine, a control signal indicating the idling revolution speed is outputted to the engine, and thereby fixes the engine revolution speed to the idling state.

In the boom height control, when the height of the boom 15 reaches the upper limit value of the boom height preliminarily set in the boom height control, the control device 30 stops the upward moving of the boom 15 irrespective of the operations of the control devices 19L and 19R.

That is, in the boom height control, when the boom angle at the time of upward moving operation of the boom 15 reaches the upper limit value, the flow rate control valve corresponding to the boom cylinder C3 is controlled, and thereby the upward moving of the boom 15 is stopped.

In the angle control of the arm, when the angle of arm reaches the upper limit value or the lower limit value of the angle of arm angle (the arm angle) preliminarily set, the control device 30 controls the arm 16 to stop the scraping operation irrespective of the operations of the operation devices 19L and 19R.

That is, in the arm angle control, when the arm angle at the time of the scraping operation of the arm 16 reaches the upper limit value or the lower limit value, the control device 30 controls the flow rate control valve corresponding to the arm cylinder C4, and thereby stops the scraping operation of the arm 16.

In the anti-theft control, when authentication between the authentication information registered in advance (the second authentication information) and the authentication information (the first authentication information) transmitted from the outside such as the mobile terminal 50 is established, the control device 30 provides permission to start the prime mover E1 (the engine), and thereby drives the engine.

In addition, in the anti-theft control, when the authentication between the first authentication information and the second authentication information is not established, the control device 30 does not provide the permission of the engine start, and thereby does not start the engine.

As described above, the control device 30 is configured to perform various controls such as the hydraulic control, the automatic idle control (the AI control), the boom height control, the arm height control, the anti-theft control, and the like. Meanwhile, the controls described above are just the examples and are not limited, and the control device 30 executes necessary controls in accordance with to the modes of the working machine 1.

The control device 30 has a storage part (a storage device) 33 and a time counting part 34. The time counting part 34 is constituted of electric/electronic parts provided in the control device 30, programs stored in the control device 30, or the like. The time counting part 34 counts the operation time until the input of the engine revolution speed to the control device 30 is terminated from the time of starting to input, to the control device 30, the engine revolution speed detected by the engine rotation sensor (start of driving) until the engine revolution speed reaches the control device 30.

In other words, the time counting part 34 obtains, by a timer or the like, the time (the elapsed time) during which the engine is driven. For example, when the engine is driven continuously from 9 o'clock to 12 o'clock, the operation time (the elapsed time) is 3 hours. The time counting part 34 obtains the accumulated operation time (the hour meter) by accumulating the counted operation time every time when the engine is driven (from the start of driving the engine to the end of driving the engine).

In this embodiment, the accumulated value of the operation time from the start of driving the engine to the end of driving the engine is set as the accumulated operation time. However, the time during which the driven parts other than the engine is driven may be employed as the accumulated operation time (the hour meter), and the driving parts are not limited to the engine. The storage part 33 is constituted of a nonvolatile memory or the like, and is configured to store the accumulated operation time counted by the time counting part 34.

As shown in FIG. 1, the working machine 1 has a communication device 40. The communication device 40 is a device configured to output the data (the information) of the working machine 1 to the outside of the working machine 1 and to capture the external data to the working machine 1. The communication device 40 has a first communication part 41. The first communication part 41 is configured to be connected to the mobile terminal 50.

For example, the first communication part 41 can transmit, to the mobile terminal 50, a beacon of a communication scheme conforming to the Bluetooth (a registered trademark) Low Energy in the Bluetooth (a registered trademark) specification of the communication standard IEEE 802.15.1 series.

Figure 2:
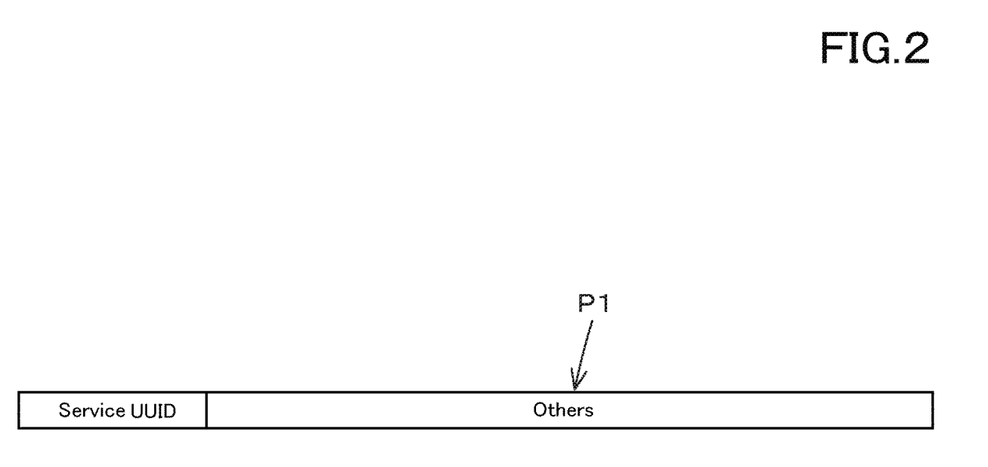
FIG. 2 is a schematic view illustrating an advertisement packet P1 according to the embodiment.

As shown in FIG. 2, the beacon includes a service UUID (a Service Universal Unique Identifier). An application identifier is set to the service UUID. The application identifier is information used for identifying a plurality of applications (the application software) preliminarily prepared.

Figure 3:
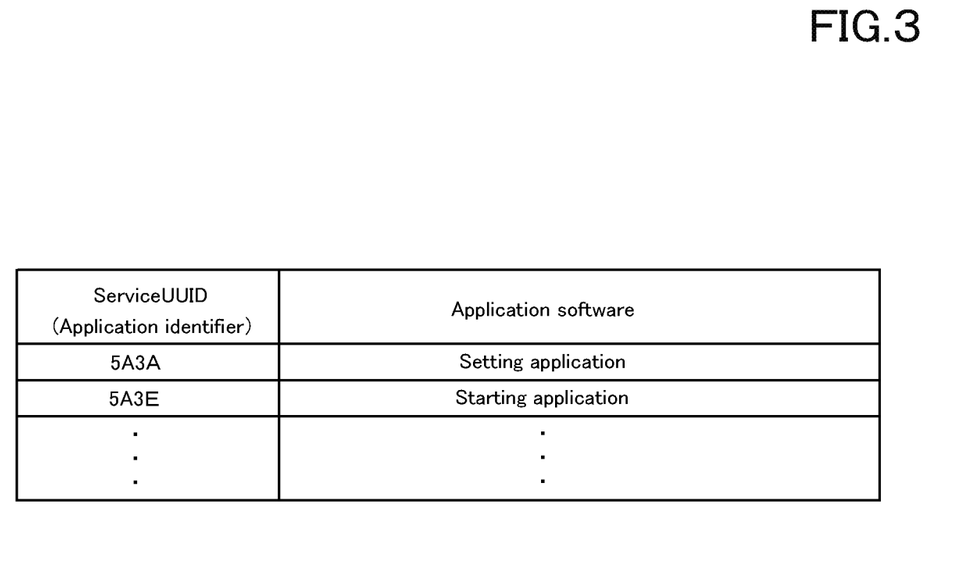
FIG. 3 is a view illustrating a relation between a plurality of applications and an application identifier according to the embodiment.

An application identifier is assigned to each of the plurality of applications. In the embodiment, for example, a setting application for setting the working machine and a starting application for judging whether to start the driving part of the working machine are prepared as the plurality of applications as shown in FIG. 3.

The communication device 40 includes a collecting part 42 and a storage part (a storage device) 43. The collecting part 42 is constituted of electric/electronic parts provided in the communication device 40, programs stored in the communication device 40, and the like. The collecting part 42 is configured to collect the machine information on the working machine.

In particular, the communication device 40, the control device 30 provided in the working machine 1, and the devices such as the sensors are connected to each other by a communication line L1 or the like, and the collecting part 42 obtains various signals flowing in the communication line L1 (the data) as the machine information.

In particular, the collecting part 42 collects, as the machine information, signals from various sensors, the cumulative operation times, and the like in the state where the control device 30 performs the automatic idle control, the boom height control, the arm height control, and the like. In the embodiment mentioned above, the signals and the cumulative operation information of the case where the control device 30 is performing the control are employed as the machine information. However, the machine information collected by the collecting part 42 is not limited thereto.

The collecting part 42 may collect, as the machine information, the information on malfunction and warning of the devices mounted on the working machine 1, or may collect, as the machine information, the setting values and the like of the device of the working machine 1. Thus, any types of the information relating to the working machine 1 can be employed as the machine information.

The storage part 43 is constituted of a nonvolatile memory or the like, and temporarily stores the machine information collected by the collecting part 42. The machine information temporarily stored in the storage part 43, that is, the machine information collected by the collecting part 42 is transmitted to the mobile terminal 50 by the communication device 40 (the first communication part 41).

The communication device 40 has an identifier setting part 45. The identifier setting part 45 is constituted of electric/electronic parts provided in the communication device 40, programs stored in the communication device 40, and the like.

The identifier setting part 45 sets the application identifiers corresponding to the plurality of applications. For example, in the case of requesting the setting of the working machine to the mobile terminal 50, the identifier setting part 45 sets the application identifier corresponding to the setting application.

In addition, in the case of requesting to transmit the first authentication information to the mobile terminal 50 under the state where the prime mover E1 is not started, the identifier setting part 45 sets the application identifier corresponding to the starting application.

Hereinafter, the application identifier corresponding to the setting application is referred to as "a setting identifier", and the application identifier corresponding to the starting application is referred to as "a starting identifier".

The communication device 40 is provided with a switch configured to be turned on and off by an operator or the like. In the case where the switch is on, the communication device 40 is set to a registration mode, and in the case where the switch is off, the registration mode is canceled. That is, when the operator turns the switch on and off, the registration mode of the communication device 40 can be switched between to be valid and to be invalid.

The mobile terminal 50 is a tablet computer, a smartphone, a PDA, or the like, and can be carried around. The mobile terminal 50 is configured to be connected to the communication device 40 provided in the working machine 1, and is configured to transmit and receive the various data (the various information) to and from the communication device 40. The mobile terminal 50 has a second communication part 51.

The second communication part 51 is constituted of a communication module or the like for performing the short-range communication and the long-range communication, and performs the wireless communication with the communication device 40 in accordance with the Bluetooth (a registered trademark) Low Energy and the like in the specification of Bluetooth (a registered trademark) of the communication standard IEEE 802.15.1 series. Meanwhile, note that the second communication part may perform the wireless communication in the mobile phone communication network, the data communication network, or the like.

The mobile terminal 50 includes a storage part (a storage device) 52, a display part (a display device) 53, and a calculation part 54. The storage part 52 is constituted of a nonvolatile memory, and is configured to store the machine information received from the communication device 40, the various application software (the various applications), an operation system (OS), and the like.

Figure 5:
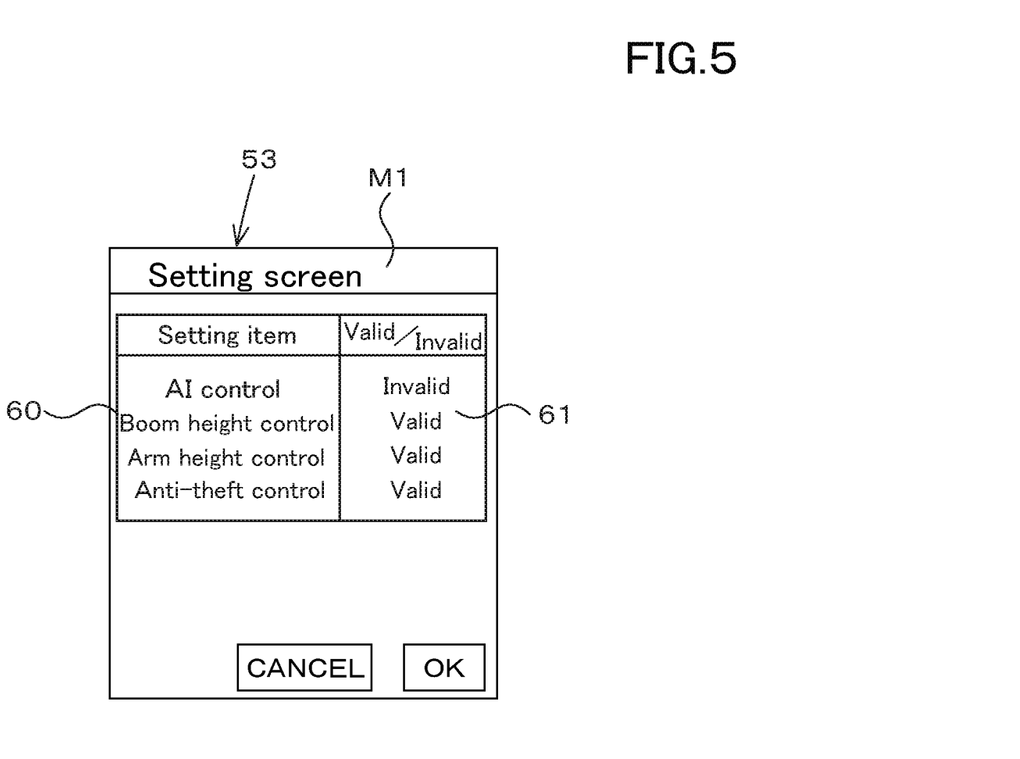
FIG. 5 is a view illustrating an example of a setting screen according to the embodiment.

The display part 53 is configured to display the various information, and is constituted of a liquid crystal panel or the like. As shown in FIG. 5, it is possible to display a setting screen M1 for performing the various settings of the working machine on the display part 53. A plurality of setting items 60 are displayed on the setting screen M1, and a setting value 61 corresponding to the setting item 60 is displayed on the setting screen M1.

In the embodiment, the setting items 60 of the automatic idle control (the AI control), the boom height control, the arm height control, and the anti-theft control are displayed, and the validity or the invalidity of each of the controls is displayed as the setting value 61 of the setting item 60.

In the setting screen M1, the setting value 61 can be changed, and either one of the valid and the invalid can be chosen. Meanwhile, the setting screen M1, the setting item 60, and the setting value 61 are just examples and are not limited thereto.

The calculation part 54 is constituted of a CPU, electric/electronic parts and the like provided in the mobile terminal 50, and the calculation part 54 performs the various processes of the mobile terminal 50.

The calculation part 54 performs a pairing process between the mobile terminal 50 and the communication device 40, and performs the process according to the application.

Figure 4:
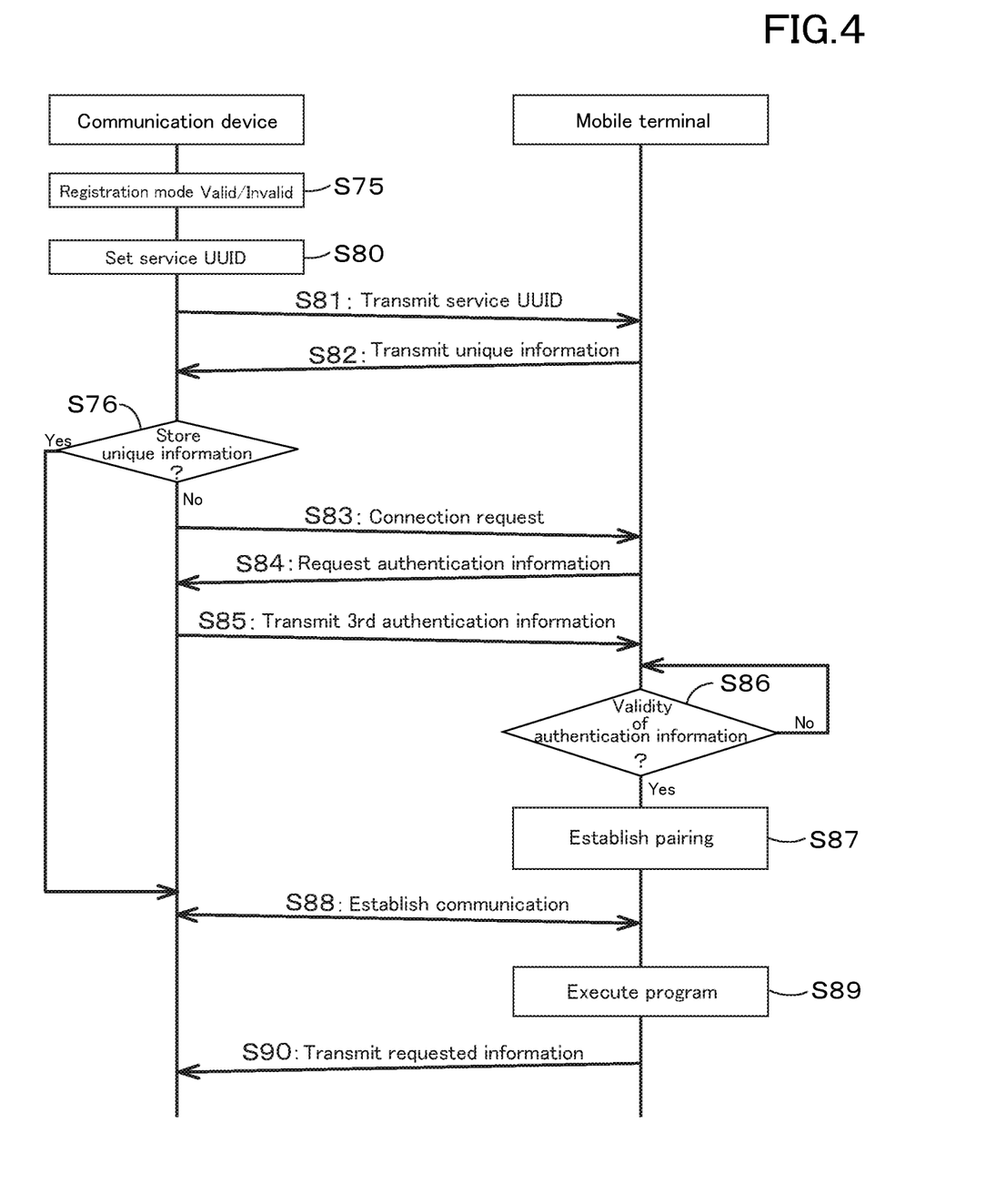
FIG. 4 is a view illustrating a flowchart showing a flow of connecting between a communication device and a mobile terminal according to the embodiment.

FIG. 4 shows a flowchart of the connection between the communication device 40 and the mobile terminal 50. With reference to FIG. 4, the communication device 40 and the mobile terminal 50 will be described in detail.

As shown in FIG. 4, the communication device 40 and the mobile terminal 50 perform the communication conforming to the BLE. In the communication conforming to the BLE, the communication device 40 is a central device, and the communication device 50 is a peripheral device.

Under the state where the electric power from the battery or the like is supplied to the communication device 40, it is possible to transmit irregularly or periodically the beacon of the communication device 40. For example, the electric power is supplied to the communication device 40 in both of the state where the ignition switch of the working machine 1 is in the OFF state and the state where the ignition switch of the working machine 1 is in the ON state.

First, in the state where the electric power is supplied, the communication device 40 refers to whether the registration mode of the communication device 40 is valid or invalid (step S75).

Next, the identifier setting part 45 of the communication device 40 sets the application identifier as necessary (step S80: identifier setting processing).

In the identifier setting processing S80, for example, the setting identifier is set to the service UUID when the setting of the working machine is requested to the mobile terminal 50.

In the identifier setting process S80, in the case where the engine is driven under the state where the engine is not started (the state in which the driving of the engine is stopped), the starting identifier is set to the service UUID.

When the setting of the application identifier is completed, the communication device 40 transmits, in the beacon, a service UUID including any one of the setting identifier and the starting identifier (step S81).

When the second communication part 51 of the mobile terminal 50 receives the service UUID, the second communication part 51 of the mobile terminal 50 transmits the unique information such as the MAC address, the serial code, and the like (step S82).

The communication device 40 judges whether or not the unique information transmitted from the mobile terminal 50 has already been obtained, that is, whether the communication device 40 stores the unique information transmitted from the mobile terminal 50 (step S76).

In the case where the communication device 40 does not store the unique information (step S76, No) and the communication device 40 is in the registration mode, the calculation part 54 of the communication device 40, after receiving the unique information, issues the connection request to the mobile terminal 50 through the second communication part 51 (step S83).

On the other hand, in the case where the communication device 40 stores the unique information (step S76, Yes) and is not in the registration mode, the process of the communication device 40 omits the pairing process and proceeds to step S88 described later.

In the case where the communication device 40 does not store the unique information and is not in the registration mode, the communication device 40 ignores the transmission of the unique information and does not connect to the mobile terminal 50.

Meanwhile, when the mobile terminal 50 receives the connection request issued from the communication device 40, the calculation part 54 executes the pairing process.

In the pairing process, the calculation part 54 requests the communication device 40 to transmit the third authentication information via the second communication part 51 (step S84).

The third authentication information is the information necessary for authentication of the pairing between the communication device 40 and the mobile terminal 50, and is constituted of a predetermined alphanumeric character or the like. The third authentication information is stored in the storage part 43 of the communication device 40.

In response to the request for transmission of the third authentication information, the first communication part 41 of the communication device 40 transmits, to the mobile terminal 50, the third authentication information stored in the storage part 43 (step S85).

When the second communication part 51 of the mobile terminal 50 receives the third authentication information, the calculation part 54 of the mobile terminal 50 judges whether the third authentication information received above is related to the fourth authentication information preliminarily stored in the storage part 43. In other words, that checks the validity of the third authentication information received above (step S86).

In the case where the third authentication information and the fourth authentication information are associated with each other, the calculation part 84 determines that the pairing is established (step S87).

In the case where the pairing is established, the communication device 40 stores the unique information transmitted from the mobile terminal 50 at step S82. That is, after the pairing process is established, the communication device 40 registers the unique information of the mobile terminal 50.

The fourth authentication information is information necessary for the authentication and is constituted of the predetermined alphanumeric characters or the like.

in purchasing the working machine 1, renting the working machine 1, and the like, the purchaser obtains the fourth authentication information associated with the third authentication information from the sales company, the manufacturing company, the rental company, or the like of the working machine 1. And then, the purchaser registers the fourth authentication information to the mobile terminal 50.

Meanwhile, the obtaining source of the fourth authentication information is just an example, and the obtaining source is not limited to that described in the above-mentioned embodiment.

After the pairing between the communication device 40 and the mobile terminal 50 is established, the bidirectional communication between the first communication part 41 of the communication device 40 and the second communication part 51 of the mobile terminal 50 is established (step S88).

Thereafter, the calculation part 54 of the mobile terminal 50 executes the application indicated by the service UUID transmitted from the communication device 40.

In the case where the service UUID is the setting identifier, the calculation part 54 of the mobile terminal 50 executes the setting application. And, in the case where the service UUID is the starting identifier, the calculation part 54 executes the starting application (step S89).

After the application is executed, the second communication part 51 of the mobile terminal 50 transmits the data requested from the communication device 40 in accordance with the application (step S90).

For example, in the case of the setting application, the second communication part 51 of the mobile terminal 50 transmits, to the communication device 40, the setting item 60 and the setting value 61 set on the setting screen M1.

When the communication device 40 receives the setting item 60 and the setting value 61, the communication device 40 transmits, to the control device 30, the setting item 60 and the set value 61 both received above, and then the control device 30 rewrites the setting value corresponding to the setting item 60.

Alternatively, in the case of the starting application, the second communication part 51 of the mobile terminal 50 receives the first authentication information.

When the communication device 40 receives the first authentication information, the communication device 40 transmits, to the control device 30, the first authentication information received above. The control device 30 starts the engine when the authentication between the first authentication information and the second authentication information is established.

In addition, in the case where the authentication between the first authentication information and the second authentication information is not established, the control device 30 does not start the engine.

The number of the above-described applications is not limited to the above example, and may be two or more, three or more, or further more.

In addition, although the pairing process is performed between the communication device 40 and the mobile terminal 50, the pairing process may be omitted.

The communication system for the working machine described above is a communication system for the working machine including the communication device 40 provided in the working machine 1 and the mobile terminal 50 configured to be connected to the communication device 40. The communication device 40 transmits the service UUID to the mobile terminal 50. The mobile terminal 50 transmits the unique information to the communication device 40. After receiving the unique information, the communication device 40 issues the connection request to the mobile terminal 50. After the connection request is made, the mobile terminal 50 requests the transmission of the authentication information to be used in the pairing. The communication device 40 transmits the authentication information to the mobile terminal 50 in response to the request. The mobile terminal 50 judges whether or not the pairing is established based on the authentication information, and executes the program based on the service UUID in the case where the pairing is established. According to that, it is possible to execute the pairing process and a program corresponding to and the service UUID in response to the receiving of the service UUID transmitted by the communication device 40 as a trigger.

As described above, in the case of connecting the mobile terminal 50 and the communication device 40 to each other, the communication device 40 side stores the unique information of the mobile terminal 50. Or, the connection with the mobile terminal 50 is established in the case where the communication device 40 side is set in the registration mode and does not store the unique information. Thus, the working machine side (the communication device 40 side) can select the mobile terminal 50 to be connected. In other words, the working machine side can have authority to connect with the mobile terminal 50, so that it is possible for only the mobile terminal 50 of an authorized person such as an operator or a manager to connect to the working machine.

After the execution of program, the mobile terminal 50 transmits the data requested from the communication device 40.

The communication processing method for the working machine is a communication processing method for the working machine which connects the communication device disposed on the working machine 1 to the mobile terminal to be connected to the communication device 40. The communication processing method for the working machine includes steps of transmitting, by the communication device 40, the service UUID to the mobile terminal 50, transmitting, by the mobile terminal 50, the unique information to the communication device 40, issuing the connection request, by the communication device 40, to the mobile terminal 50 after receiving the unique information, requesting, by the mobile terminal 50, transmission of authentication information after issuing the connection request, the authentication information being used for the paring, transmitting, by the communication device 40, the authentication information to the mobile terminal 50 in response to the request, and judging, by the mobile terminal 50, whether the paring is established based on the authentication information and then executing a program based on the service UUID when the paring is established.

According to that, it is possible to execute the pairing processing and a program corresponding to the service UUID in response to the receiving of the service UUID transmitted by the communication device 40 as a trigger.

Figure 6:
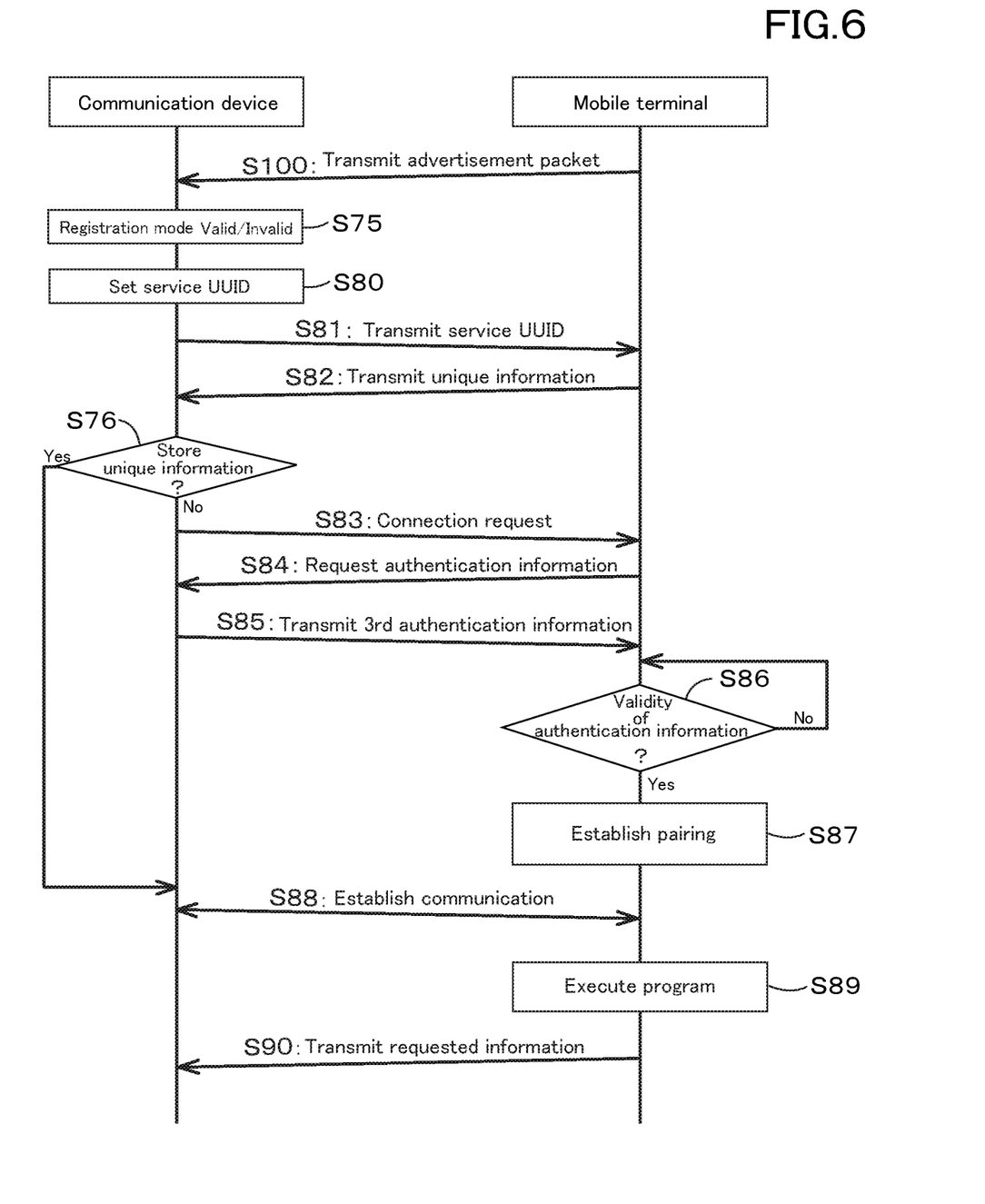
FIG. 6 is a view illustrating a flowchart showing a modified example of a flow of connecting between the communication device and the mobile terminal according to the embodiment.

FIG. 6 shows a flowchart of a modified example of the connection between the communication device 40 and the mobile terminal 50. With reference to FIG. 6, the communication device 40 and the mobile terminal 50 in the modified example will be described.

As shown in FIG. 6, the second communication part 51 of the mobile terminal 50 transmits the advertisement packet (the beacon) (step S100).

In the case where the communication device 40 exists in the communication area of the advertisement packet (the area in which the advertisement packet can be received), the first communication part 41 receives the advertisement packet.

When the first communication part 41 of the communication device 40 receives the advertisement packet, the identifier setting processing S80 is performed by the identifier setting part 45.

The identifier setting process S80 is the same as that of FIG. 4, so the explanation thereof is omitted.

In addition, the reference to the registration mode (step S75), the confirmation of the presence/absence of storage of the unique information (step S76), and step S81 to step S90 after the identifier setting processing S80 are the same as those of FIG. 4.

That is, in FIG. 6, the mobile terminal 50 transmits the advertisement packet to the communication device 40. The communication device 40 transmits the service UUID to the mobile terminal 50 in response to the advertisement packet.

The mobile terminal 50 transmits the unique information to the communication device 40. After receiving the unique information, the communication device 40 issues the connection request to the mobile terminal 50. The mobile terminal 50 requests the transmission of authentication information to be used in the pairing after the connection request is issued. The communication device 40 transmits the authentication information to the mobile terminal 50 in response to the request. The mobile terminal 50 judges whether or not the pairing is established based on the authentication information, and executes the program based on the service UUID in the case where the pairing is established.

According to that, it is possible to execute the pairing processing and a program corresponding to the service UUID in response to the receiving of the service UUID transmitted by the mobile terminal 50 as a trigger.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A communication system for a working machine comprising:
   a communication device disposed on the working machine; and a mobile terminal to be connected to the communication device, the mobile terminal having unique information unique to the mobile terminal, wherein the communication device includes a storage to register the unique information, and a switch to be switched between a first position to allow registration of the unique information in the storage and a second position to prevent the registration of the unique information in the storage, the communication device transmits, to the mobile terminal, a service universal unique identifier (UUID) containing an application identifier that identifies an application programmed to operate the working machine by the mobile terminal, the mobile terminal transmits the unique information to the communication device, in a case where the storage has not registered the unique information of the mobile terminal, the communication device transmits connection request to the mobile terminal after receiving the unique information when the switch is switched to the first position, and does not establish the bidirectional communication with the mobile terminal when the switch is switched to the second position, thereby to allow an operator of the working machine to determine timing when the communication device accepts the unique information of the mobile terminal to be registered, based on whether the switch is switched to the first position or the second position, the mobile terminal requests the communication device to transmit authentication information for paring with the communication device after receiving the connection request, the communication device transmits the authentication information to the mobile terminal in response to the connection request, the mobile terminal judges whether the paring is established based on the authentication information, the mobile terminal establishes bidirectional communication with the communication device, and executes the application identified by the application identifier contained in the service universal unique identifier (UUID) when the paring is established, the communication device registers in the storage, the unique information of the mobile terminal with which the bidirectional communication is established.

2. The communication system according to claim 1, wherein
in a case where the storage has registered the unique information of the mobile terminal, the mobile terminal establishes the bidirectional communication with the communication device without transmitting the connection request to the mobile terminal.

3. The communication system according to claim 1, wherein
the mobile terminal transmits an advertisement packet to the communication device, and
the communication device transmits the service universal unique identifier (UUID) to the mobile terminal in response to the advertisement packet.

4. The communication system according to claim 1, wherein
the mobile terminal transmits data requested by the communication device after executing the application.

5. The communication system according to claim 1, wherein
the application includes at least one of a starting application for starting a driving part of the working machine and a setting application for setting the working machine.

6. The communication system according to claim 1, wherein
the mobile terminal is one selected from a group consisting of a tablet computer, a smartphone, and a PDA.

7. The communication system according to claim 1, wherein
the working machine is one selected from a group consisting of a tractor, a combine, a rice transplanter, a compact track loader, and a skid steer loader.

8. The communication system according to claim 1, wherein
the working machine includes a prime mover, and
the application is a starting application to cause the prime mover of the working machine to start when executed by the mobile terminal.

9. The communication system according to claim 1, wherein
the working machine includes a setting item of which setting value is capable of being changed, and
the application is a setting application to allow the setting value of the setting item of the working machine to be changed when executed by the mobile terminal.

10. A communication system for a working machine comprising:
a communication device disposed on the working machine; and
a mobile terminal to be connected to the communication device, the mobile terminal having unique information unique to the mobile terminal, wherein the communication device includes a storage to register the unique information, and a switch to be switched between a first position to allow registration of the unique information in the storage and a second position to prevent the registration of the unique information in the storage, the communication device transmits, to the mobile terminal, a service universal unique identifier (UUID), the mobile terminal transmits the unique information to the communication device, in a case where the storage has not registered the unique information of the mobile terminal, the communication device transmits connection request to the mobile terminal after receiving the unique information when the switch is switched to the first position, and does not establish the bidirectional communication with the mobile terminal when the switch is switched to the second position, thereby to allow an operator of the working machine to determine timing when the communication device accepts the unique information of the mobile terminal to be registered, based on whether the switch is switched to the first position or the second position, the mobile terminal requests the communication device to transmit authentication information for paring with the communication device after receiving the connection request, the communication device transmits the authentication information to the mobile terminal in response to the connection request, the mobile terminal judges whether the paring is established based on the authentication information, the mobile terminal establishes bidirectional communication with the communication device, and executes the application in the service universal unique identifier (UUID) when the paring is established,
the communication device registers in the storage, the unique information of the mobile terminal with which the bidirectional communication is established.

11. The communication system according to claim 10, wherein
in a case where the storage has registered the unique information of the mobile terminal, the mobile terminal establishes the bidirectional communication with the communication device without transmitting the connection request to the mobile terminal.

12. A communication processing method for communication between a communication device disposed on a working machine and a mobile terminal having unique information unique to the mobile terminal,
the communication device including a storage to register the unique information, and a switch to be switched between a first position to allow registration of the unique information in the storage and a second position to prevent the registration of the unique information in the storage,
the communication processing method comprising:
transmitting from the communication device to the mobile terminal, a service universal unique identifier (UUID) containing an application identifier that identifies an application programmed to operate the working machine by the mobile terminal;
transmitting the unique information from the mobile terminal to the communication device;
in a case where the storage has not registered the unique information of the mobile terminal,
transmitting connection request from the communication device to the mobile terminal after receiving the unique information when the switch is switched to the first position, and
establishing no bidirectional communication between the communication device and the mobile terminal when the switch is switched to the second position, thereby to allow an operator of the working machine to determine timing when the communication device accepts the unique information of the mobile terminal to be registered, based on whether the switch is switched to the first position or the second position;
requesting from the mobile terminal to the communication device, to transmit authentication information for paring with the communication device after receiving the connection request;
transmitting the authentication information from the communication device to the mobile terminal in response to the connection request,
judging, by the mobile terminal, whether the paring is established based on the authentication information;
establishing bidirectional communication between the communication device and the mobile terminal and executing the application identified by the application identifier contained in the service universal unique identifier (UUID) when the paring is established; and
registering in the storage of the communication device, the unique information of the mobile terminal with which the bidirectional communication is established.

13. The communication processing method according to claim 12, wherein
the bidirectional communication is established between the communication device and the mobile terminal without transmitting the connection request to the mobile terminal, in a case where the storage has registered the unique information of the mobile terminal.

14. The communication processing method according to claim 12, comprising:
transmitting an advertisement packet from the mobile terminal to the communication device; and
transmitting the service universal unique identifier (UUID) from the communication device to the mobile terminal in response to the advertisement packet.

15. The communication processing method according to claim 12, comprising:
transmitting data requested by the communication device to the mobile terminal, after executing the application.

16. The communication processing method according to claim 12, comprising:
transmitting connection request from the communication device to the mobile terminal after receiving the unique information, in a case where the storage has not registered the unique information of the mobile terminal and the switch is switched to the first position.

17. A communication processing method for communication between a communication device disposed on a working machine and a mobile terminal having unique information unique to the mobile terminal,
the communication device including a storage to register the unique information, and a switch to be switched between a first position to allow registration of the unique information in the storage and a second position to prevent the registration of the unique information in the storage,
the communication processing method comprising:
transmitting from the communication device to the mobile terminal, a service universal unique identifier (UUID);
transmitting the unique information from the mobile terminal to the communication device;
in a case where the storage has not registered the unique information of the mobile terminal,
transmitting connection request from the communication device to the mobile terminal after receiving the unique information when the switch is switched to the first position, and
establishing no bidirectional communication between the communication device and the mobile terminal when the switch is switched to the second position, thereby to allow an operator of the working machine to determine timing when the communication device accepts the unique information of the mobile terminal to be registered, based on whether the switch is switched to the first position or the second position;
requesting from the mobile terminal to the communication device, to transmit authentication information for paring with the communication device after receiving the connection request;
transmitting the authentication information from the communication device to the mobile terminal in response to the connection request,
judging, by the mobile terminal, whether the paring is established based on the authentication information;
establishing bidirectional communication between the communication device and the mobile terminal and executing the application in the service universal unique identifier (UUID) when the paring is established; and
registering in the storage of the communication device, the unique information of the mobile terminal with which the bidirectional communication is established.

18. The communication processing method according to claim 17, wherein
the bidirectional communication is established between the communication device and the mobile terminal without transmitting the connection request to the mobile terminal, in a case where the storage has registered the unique information of the mobile terminal.

19. The communication processing method according to claim 17, comprising:
transmitting connection request from the communication device to the mobile terminal after receiving the unique information, in a case where the storage has not registered the unique information of the mobile terminal and the switch is switched to the first position.

* * * * *